US006608521B1

(12) United States Patent
Baldwin et al.

(10) Patent No.: US 6,608,521 B1
(45) Date of Patent: Aug. 19, 2003

(54) PULSE WIDTH MODULATION REGULATOR CONTROL CIRCUIT HAVING PRECISE FREQUENCY AND AMPLITUDE CONTROL

(75) Inventors: David J. Baldwin, Allen, TX (US); Timothy J. Legat, Allen, TX (US); Sanmukh Patel, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/145,417

(22) Filed: May 14, 2002

(51) Int. Cl.[7] .............................. H03F 3/38; G05F 1/40
(52) U.S. Cl. .......................................... 330/10; 323/268
(58) Field of Search ................................. 323/268, 272, 323/282, 288; 330/2.51, 207, 10, 295

(56) References Cited

U.S. PATENT DOCUMENTS

| | | | |
|---|---|---|---|
| 3,768,373 A | * 10/1973 | Divigard | ................... 91/417 R |
| 4,386,311 A | 5/1983 | Bafaro | |
| 4,415,862 A | * 11/1983 | Kunugi | ........................ 330/10 |
| 4,471,280 A | 9/1984 | Stack | |
| 4,675,588 A | 6/1987 | Talbot | |
| 4,709,315 A | 11/1987 | Ramos | |
| 4,891,764 A | 1/1990 | McIntosh | |
| 4,949,048 A | * 8/1990 | Tokumo et al. | ................ 330/10 |
| 5,262,733 A | * 11/1993 | Nakajima et al. | .............. 330/10 |
| 5,264,782 A | 11/1993 | Newton | |
| 5,652,521 A | 7/1997 | Meyer | |
| 6,229,289 B1 | 5/2001 | Piovaccari et al. | |

\* cited by examiner

Primary Examiner—Rajnikant B. Patel
(74) Attorney, Agent, or Firm—April M. Mosby; Wade James Brady, III; Frederick J. Telecky, Jr.

(57) ABSTRACT

A control circuit (50) for a switch mode power converter having precise control of amplitude and frequency that does not exhibit overshoot error nor undershoot error during a fast charge cycle nor a fast discharge cycle, respectively. In a first embodiment, the control circuit (50) does not exhibit undershoot error during a fast discharge cycle. The control circuit (50) comprises an oscillator (70) for providing a periodic carrier signal comprising a sawtooth wave output signal ($V_{ST}$). The oscillator (70) includes a capacitor ($C_{T2}$) charged and discharged to the power supply voltage ($V_{CC}$) to provide the sawtooth wave output signal ($V_{ST}$). In addition, the oscillator (70) includes a switching circuit (65) coupled to the reference voltage level ($V_{ref}$). The control circuit (50) further includes a gain circuit (64) having a reference voltage input ($V_{ref2}$), voltage input ($V_{in}$) and an output (Out). The reference voltage input ($V_{ref2}$) receives the reference voltage($V_{ref}$). The voltage input ($V_{in}$) connects to the capacitor ($C_{T2}$). The output (Out) of the gain circuit (64) connects to the switching circuit (65) to provide feedback proportional to the analog error signal related to the difference between the sawtooth wave output signal ($V_{ST}$) and the predetermined reference voltage level ($V_{ref}$).

12 Claims, 5 Drawing Sheets

PULSE WIDTH MODULATION REGULATOR CONTROL CIRCUIT HAVING PRECISE FREQUENCY AND AMPLITUDE CONTROL

FIELD OF THE INVENTION

The present invention relates to switch mode regulators and, more particularly, to a control circuit for implementing pulse width modulation within the switch mode regulator having precise control of amplitude and frequency.

BACKGROUND OF THE INVENTION

Due to the decline in voltages and current requirements of conventional components, portable electronic devices have lower power requirements. The input voltage supplied to the circuitry within the portable electronic device must remain within specified voltage tolerances so that the circuitry can function reliably. The input voltage supplied by a power source, such as batteries, however, changes overtime due to contact corrosion, dissipation, temperature and other external environment conditions or changes thereof. To compensate for this problem, power converters are used to provide a constant supply of voltage to the circuitry within the prescribed voltage tolerances. The power converter receives the input voltage from the power source and converts it to a voltage within the prescribed voltage tolerance. The power converter maintains the voltage at its output which is coupled to the portable electronic device circuitry. The power converter includes circuitry to regulate the voltage of the power converter output within the voltage tolerances of the device circuitry even in the presence of wide deviations in the power source voltage.

The switch mode power converter is one such power converter that may be used in portable electronic device applications. The switch mode power converter is used to convert the power source signal to a higher or lower controlled voltage output. The switch mode power converter converts the DC voltage supplied by the power source into an AC signal in the form of a square or a sawtooth wave which is filtered to remove high frequencies. Afterwards, the AC signal is converted to a regulated DC output voltage.

A control circuit for generating pulse width modulation within the switch mode power converter functions as an oscillator which provides a periodic carrier signal comprising a sawtooth wave output signal $V_{ST}$ having a predetermined constant period T. It controls the average power that is provided to a load coupled to the switch mode power converter by controlling the average voltage applied to the load. This is done by opening and closing a switch within the switch mode power converter in rapid fashion.

Illustrated in FIG. 1, a control circuit 10 for a conventional switch mode power converter uses a sawtooth reference voltage $V_{ST}$ which includes an error amplifier 12 and a comparator 14 to generate a pulse width modulation (PWM) control signal $V_{PWM}$. An error voltage $V_E$ is derived from the difference between the regulated output (feedback) voltage $V_{fb}$ and the desired output voltage reference $V_{set}$. The error voltage $V_E$ and the sawtooth reference $V_{ST}$ are fed into comparator 14 to provide PWM control $V_{PWM}$. FIGS. 2a and 2b illustrate a graph of the PWM control signal $V_{PWM}$ and the sawtooth reference $V_{ST}$ both as a function of time. Note that the duration of the resultant PWM control signal $V_{PWM}$ ends each cycle when the ramp voltage "crosses" the error voltage $V_E$.

To increase the usefulness of a control circuit 10 within a switch mode power converter, it is necessary to incorporate adjustability of the frequency of switching and discharge rate for sawtooth waveform $V_{ST}$. One such control circuit 20 for a switch mode power converter is illustrated in FIG. 3. Control circuit 20 includes a first and second comparator, 22 and 24, a voltage divider 26, a reset flip-flop circuit 28, a first and second feedback transistor, 30 and 32, a capacitor $C_T$, and a first and second resistor, $R_{T1}$ and $D_{T1}$. First resistor $R_{T1}$ is used to set a reference charge current $I_C$ through current source $I_{C1}$. Capacitor $C_{T1}$ is used vary the charge time, which ultimately sets the frequency of converter 20. Second resistor $D_{T1}$ sets the discharge current $I_D$ through current source $I_{D1}$ The discharge time is a useful reference for "break before make" gate control of pulse width modulation regulators that employ a full or half H-bridge. The fine adjustability control circuit 20 offers is available to optimize bridge switching performance. In operation, comparators, 22 and 24, and reset flip-flop 28 alternate control circuit 20 between the charge and discharge cycles.

A problem occurs, however, at the end of a fast discharge cycle. The intrinsic propagation delay of comparator 24 causes undershoot of the low set point $V_M$ of sawtooth waveform $V_{ST}$ signified by the node coupled to the negative input of comparator 24. FIG. 4a and 4b illustrate a graph of the sawtooth reference waveform $V_{ST}$ and an expanded view of the sawtooth reference waveform $V_{ST}$, respectively, having a fast discharge cycle. As can be seen, the undershoot contributes to the error of amplitude $V_{EA}$ and frequency $1/T_E$ to the sawtooth waveform $V_{ST}$. This problem is not derived from a fixed discharge rate, since the reference for the low set point comparator 24 may be offset as well. The design parameters require variability for the sawtooth waveform $V_{ST}$ discharge cycle. Although the magnitude of the undershoot varies directly with the rate of discharge, a simple offset is not an effective solution. The undershoot is undesirable not only for the PWM control signal, $V_{PWM}$ but also for compensation networks within the switch mode regulator circuitry (not shown) that rely on a tightly controlled sawtooth waveform reference $V_{ST}$ to optimize their performance. Fortunately, due to the relatively slow rate of the charge cycle, for the present example, overshoot error is not a factor. Overshoot error as shown in FIG. 8, however, may arise if the sawtooth waveform $V_{ST}$ has a fast charge cycle and a slow discharge cycle.

Thus, a need exists for a control circuit within a switch mode power converter that does not exhibit overshoot error nor undershoot error during a fast charge cycle or a fast discharge cycle, respectively.

SUMMARY OF THE INVENTION

To address the above-discussed deficiencies of a switch mode power converter, the present invention teaches a control circuit for a switch mode power converter having precise control of amplitude and frequency that does not exhibit overshoot error nor undershoot error during a fast charge cycle nor a fast discharge cycle, respectively. In a first embodiment, the control circuit does not exhibit undershoot error during a fast discharge cycle. It comprises an oscillator for providing a periodic carrier signal comprising a sawtooth wave output signal. The oscillator includes a capacitor charged and discharged to the power supply voltage to provide the sawtooth wave output signal. In addition, the oscillator includes a switching circuit coupled to the reference voltage level. The control circuit includes a gain circuit having a reference voltage input, voltage input and an output. The reference voltage input receives the reference voltage and the voltage input connects to receive the sawtooth wave output signal. The output of the gain circuit connects to the switching circuit to provide feedback proportional to the analog error signal related to the difference between the sawtooth wave output signal and the predetermined reference voltage level.

The present approach can be similarly applied for a sawtooth waveform having a fast charge cycle and a slow discharge cycle. In a second embodiment, the control circuit does not exhibit overshoot error during a fast charge cycle. It includes similar components as the first embodiment, having slight modification.

Advantages of this design include but are not limited to a control circuit for a switch mode power converter that does not exhibit overshoot error nor undershoot error during a fast charge cycle or a fast discharge cycle, respectively.

BRIEF DESCRIPTION OF THE DRAWINGS

For a more complete understanding of the present invention and the advantages thereof, reference is now made to the following description taken in conjunction with the accompanying drawing in which like reference numbers indicate like features and wherein.

DETAILED DESCRIPTION OF PREFERRED EMBODIMENT

Figure 5:
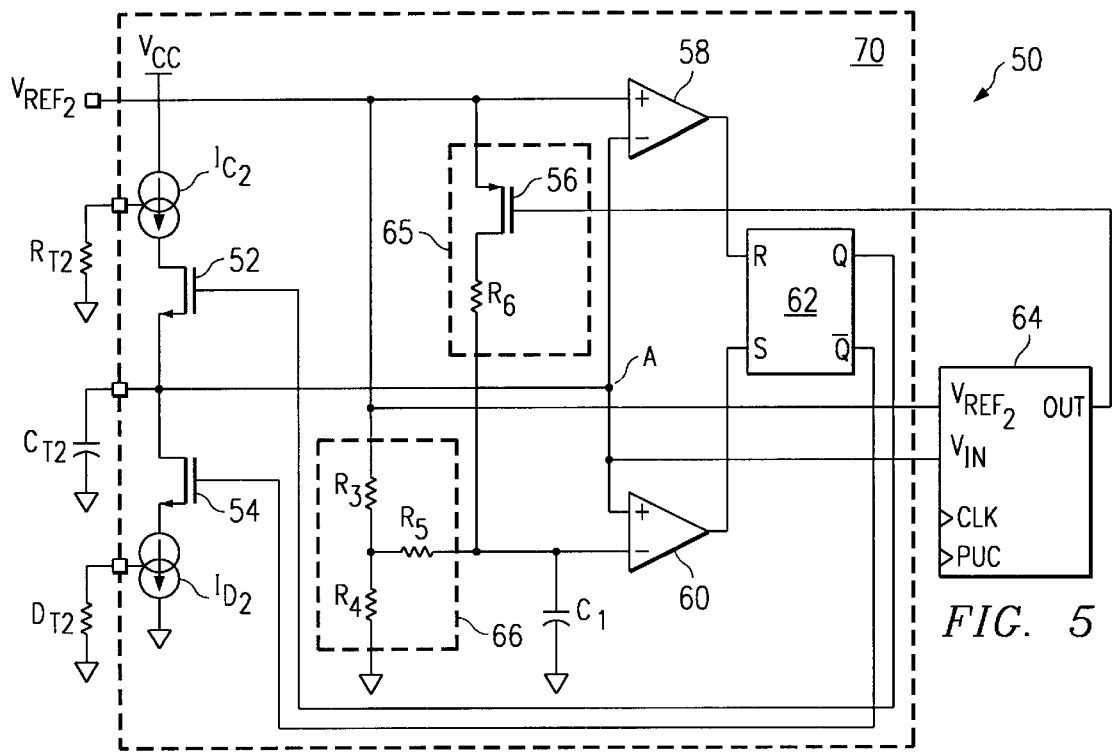
FIG. 5 illustrates a control circuit for a switch mode power converter PWM reference generator in accordance with the present invention.
Figure 9:
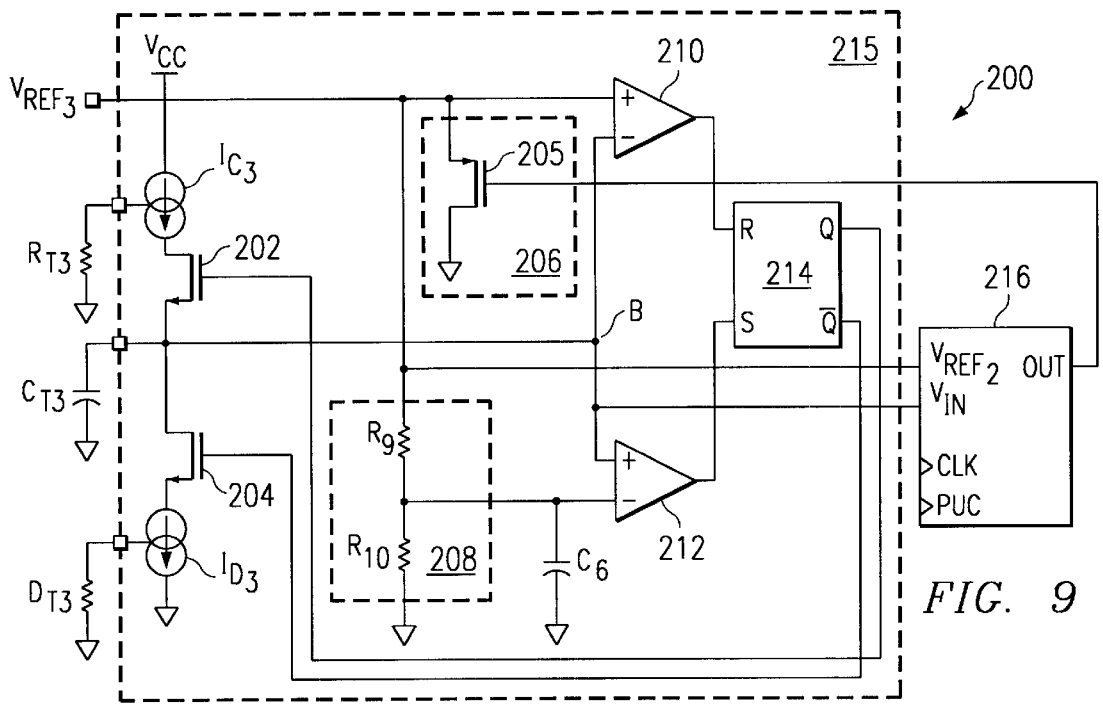
FIG. 9 displays the second embodiment of a control circuit in accordance with the present invention.

The invention provides a first embodiment of a PWM reference generator control circuit 50 for a switch mode power converter that does not exhibit undershoot error during a fast charge discharge cycle as is displayed in FIG. 5. In the alternative, the invention provides a second embodiment of a control circuit 200 for a switch mode power converter that does not exhibit overshoot error during a fast charge cycle as is shown in FIG. 9.

The first embodiment of the control circuit 50, illustrated in FIG. 5, includes oscillator 70 connected to gain circuit 64. Oscillator 70 couples to receive reference voltage level $V_{ref}$ at its input. As shown, a first current source $I_{C2}$ couples to the power supply voltage $V_{CC}$ to provide a charge current $I_C$ during the charge cycle of oscillator 70. A first resistor $R_{T2}$ connects between the first current source $I_{C2}$ and ground. A second current source $I_{D2}$ provides a charge current $I_D$ during the discharge cycle. Second current source $I_{D2}$ couples to a second resistor $D_{T2}$ which couples to ground. Capacitor $C_{T2}$ connects between ground and output node A. Oscillator 70 provides a periodic carrier signal at output node A. The periodic carrier signal may be a square wave or a sawtooth wave. In this instance, the periodic carrier signal is a sawtooth wave output signal $V_{ST}$. The sawtooth wave output signal $V_{ST}$ is generated by charging a capacitor $C_{T2}$ to reference voltage $V_{ref}$ and discharging the capacitor $C_{T2}$ to half the voltage reference by way of switched current sources $I_{C2}$ and $I_{D2}$, A first comparator 58 includes a positive input, a negative input, and an output. The positive input couples to receive the reference voltage $V_{ref}$. A second comparator 60 includes a positive input, a negative input, and an output. The positive input couples to the negative input of the first comparator 58 to form output node A. The negative input couples to the output of the voltage divider circuit 66. Voltage divider circuit 66 includes an input and an output, where the input couples to receive the reference voltage $V_{ref}$. Voltage divider circuit 66 comprises a network of resistors $R_3$, $R_4$ and $R_5$. Resistor $R_3$ which couples in series between the reference voltage node $V_{ref2}$ and resistor $R_4$, which couples to ground. Resistor $R_5$ couples between resistor $R_4$ and the negative input of the second comparator 60. A first capacitor $C_1$ couples between the negative input of the second comparator 60 and ground. A reset flip-flop 62 includes a set input, a reset input, an inverting output and a non-inverting output. The set input couples to the output of the second comparator 60. The reset input couples to the output of the first comparator 58.

A first transistor 52 includes a drain that couples to the first current source $I_{C2}$. The source of transistor 52 couples to capacitor $C_{T2}$. The gate connects to the non-inverting output of the reset flip-flop 62. A second transistor 54 includes a drain that couples to capacitor $C_{T2}$. The source of transistor 54 connects to the second current source $I_{D2}$ and the gate of transistor 54 couples to the inverting output of the reset flip-flop 62. Depending upon the cycle, charge or discharge, transistors, 52 and 54, switch on and off, respectively, to charge and discharge capacitor $C_{T2}$.

Oscillator 70 also includes switching circuit 65 which connects to receive the reference voltage level $V_{ref}$. Switching circuit 65 is used to provide an error voltage amount $V_{EA}$ supplied by gain circuit 64 to the other components of oscillator 70 to modify the low set point $V_M$ of sawtooth wave output signal $V_{ST}$. One embodiment of switching circuit 65 may include third resistor $R_6$ and a third transistor 56. The source of transistor 56 couples to receive the reference voltage $V_{ref}$. The gate of transistor 56 connects to the output node Out of gain circuit 64. Resistor $R_6$ connects between the drain of transistor 56 and the negative input of the second comparator 60. Switching circuit 65 provides the analog error signal related to the difference between the sawtooth wave output signal $V_{ST}$ and the predetermined reference voltage level $V_{ref}$ to offset the sawtooth wave output signal $V_{ST}$.

Control circuit 50 further includes gain circuit 64 having a reference voltage input $V_{ref2}$, voltage input $V_{in}$ and an output node Out. The reference voltage input $V_{ref2}$ receives the reference voltage $V_{ref}$. The voltage input $V_{in}$ connects to the capacitor or node A to receive the sawtooth wave output signal $V_{ST}$. The output node Out couples to the switching circuit 65 to provide feedback proportional to the analog error signal related to the difference between the sawtooth wave output signal $V_{ST}$ and the predetermined reference voltage level $V_{ref}$. This feedback voltage is used to modify the sawtooth wave output signal $V_{ST}$ such that the switch mode power converter using control circuit 50 does not exhibit undershoot error during a fast charge discharge cycle.

Figure 1:
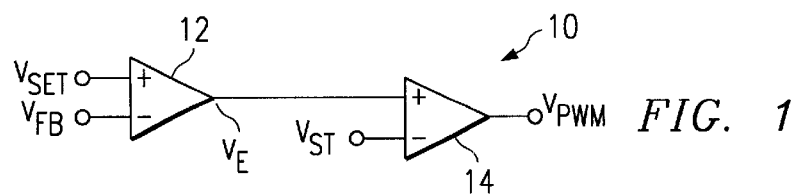
FIG. 1 illustrates known control circuit for a switch mode power converter.
Figure 2A:
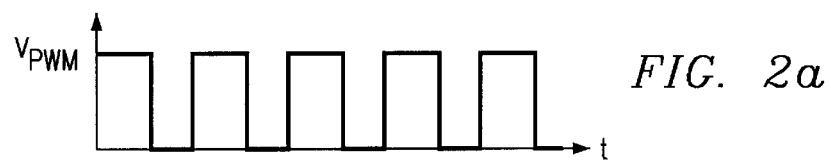
FIGS. 2a and 2b display a graph of the PWM control signal $V_{PWM}$ and sawtooth reference waveform both as a function of time, respectively.
Figure 2B:
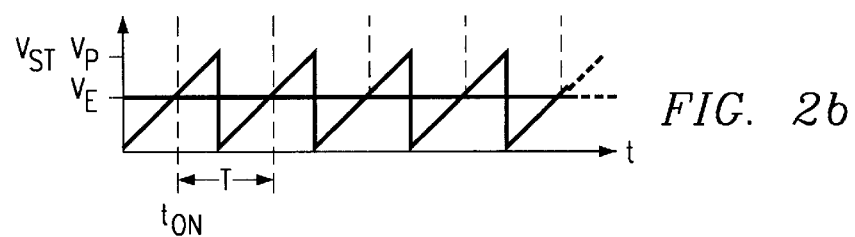
Figure 3:
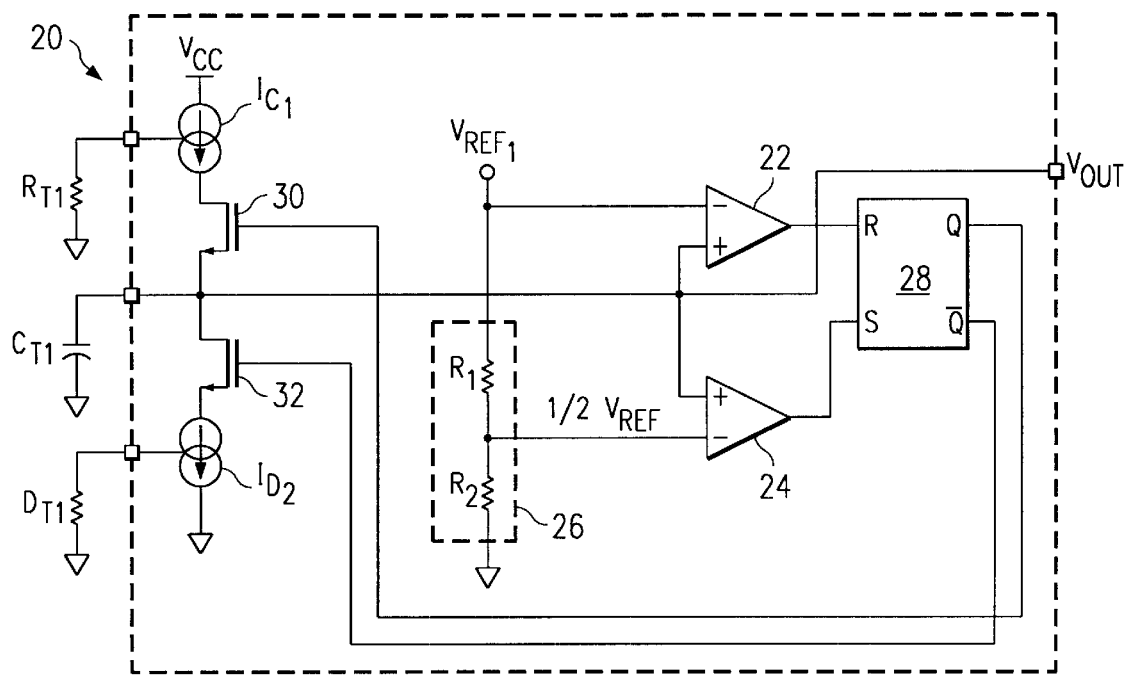
FIG. 3 shows a known control circuit for a switch mode power converter PWM reference generator.
Figure 4A:
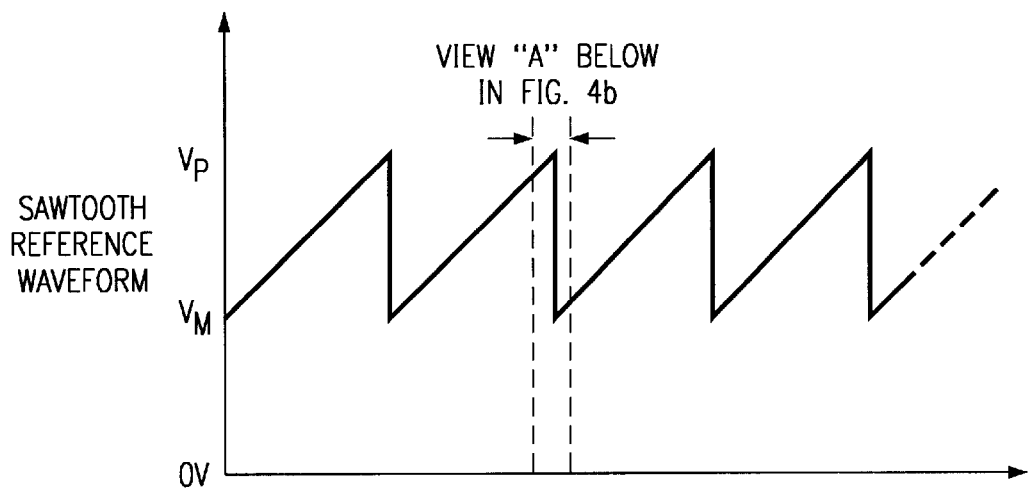
FIGS. 4a and 4b illustrate a graph of the sawtooth reference waveform $V_{ST}$ and an expanded view of the sawtooth reference waveform $V_{ST}$, respectively.
Figure 4B:
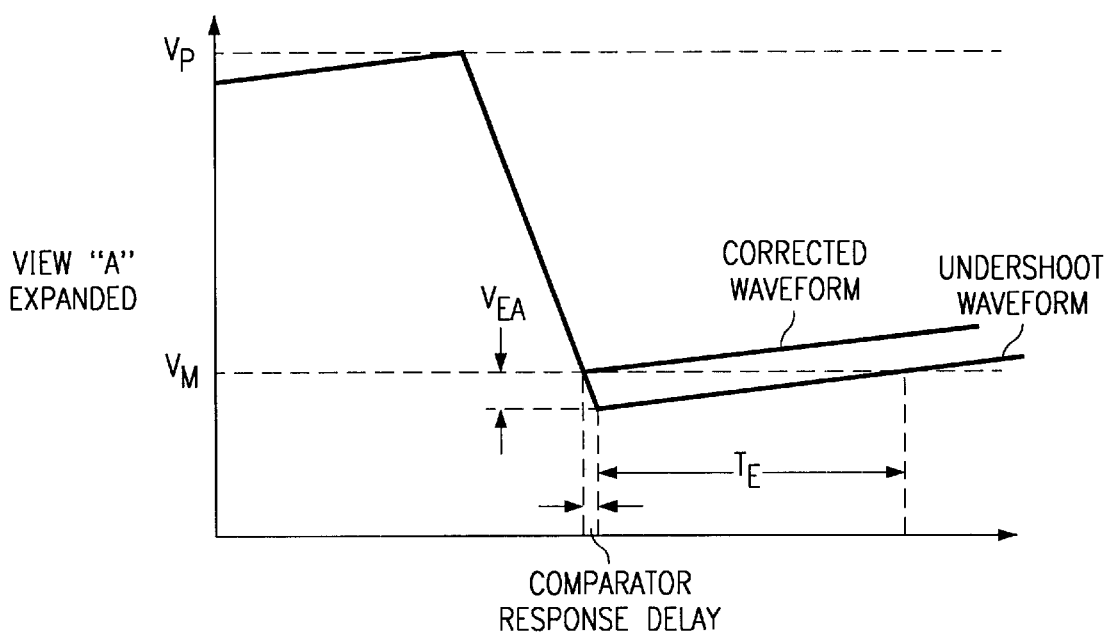

In operation, when the voltage at the negative input of comparator 60 goes below half of the reference voltage $V_{ref}$, transistor 56 turns on and feeds additional current into the negative input of comparator 60. The extra current pulls the voltage at the negative input of comparator 60 up to a corrected voltage value. In effect, as shown in FIG. 4b, the low set point $V_M$ of sawtooth waveform $V_{ST}$ is increased by a voltage error amount $V_{EA}$ using gain circuit 64.

Figure 6:
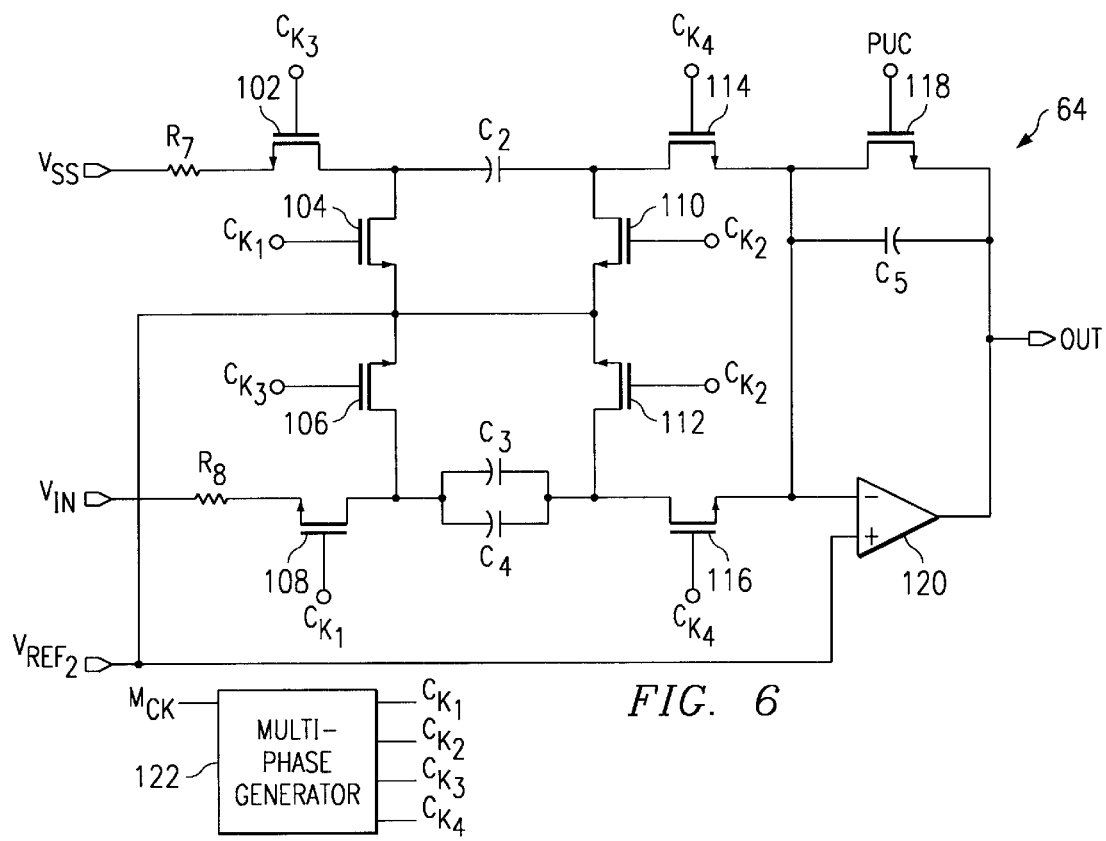
FIG. 6 illustrates the gain circuit within the control circuit of FIG. 5.

FIG. 6 illustrates a detailed schematic of gain circuit 64 within control circuit 50 for a switch mode power converter in accordance with the present invention. Resistor $R_7$ couples to the power supply $V_{SS}$ which is ground. A first transistor 102 includes a source that couples to first resistor $R_7$. The gate of transistor 102 couples to receive the third clock signal $C_{K3}$. A second transistor 104 includes a drain coupled to the drain of first transistor 102, a gate coupled to receive the first clock signal $C_{K1}$, and a source coupled to the reference voltage input $V_{ref2}$. A third transistor 106 includes a source that couples to the source of transistor 104 and a gate that couples to receive the third clock signal $C_{K3}$. A second resistor $R_8$ couples to the voltage input $V_{in}$. A fourth transistor 108 includes a source coupled to the second resistor $R_8$, a gate connected to receive the first clock signal $C_{K1}$, and a drain that connects to the drain of the third transistor 106. A first capacitor $C_2$ couples to the drain of first transistor 102. A fifth transistor 110 includes a drain that connects the first capacitor $C_2$, a gate that connects to receive second clock signal $C_{K2}$, and a source that couples to the reference voltage input $V_{ref2}$. A sixth transistor 112 includes a source that couples to the source of transistor 110 and a gate that couples to receive second clock signal $C_{K2}$. A second capacitor $C_3$ couples between the drain of third transistor 106 and the drain of sixth transistor 112. A third capacitor $C_4$ couples in parallel to the second capacitor $C_3$. A seventh transistor 114 includes a drain that couples to the drain of the fifth transistor 110 and a gate coupled to receive fourth clock signal $C_{K4}$. An eighth transistor 116 includes a drain that couples to the drain of sixth transistor 112, a source that couples to the source of seventh transistor 114, and a gate that couples to receive fourth clock signal $C_{K4}$. A fourth capacitor $C_5$ couples between the source of the eighth transistor 116 and the output Out of the gain circuit 64. A ninth transistor 118 includes a drain that couples to the source of the seventh transistor 114, a source that couples to output node Out, and a gate coupled to receive the power up/clear signal. An amplifier 120 includes a positive input that couples to the reference voltage input $V_{ref2}$, a negative input that couples to the source of eighth transistor 116 and an output that couples to the output node Out.

Figure 7:
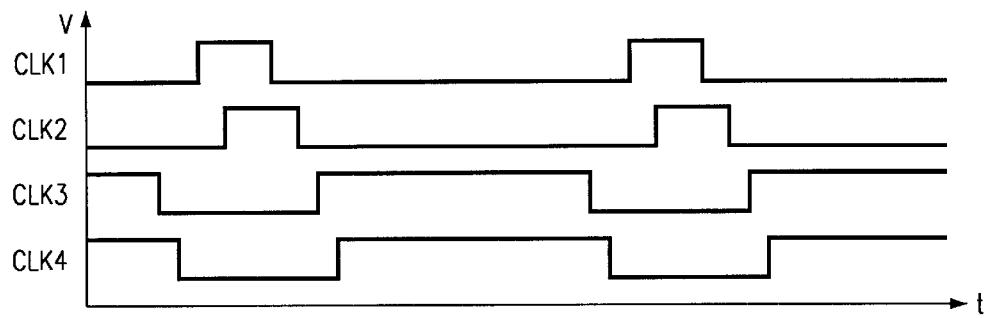
FIG. 7 represents the timing diagram for all clocks of gain circuit of FIG. 5.

Multiphase clock generator 122 generates a first, second, third and fourth clock signal, $C_{K1}$, $C_{K2}$, $C_{K3}$, and $C_{K4}$. FIG. 7 illustrates the timing diagram for each clock signal, $C_{K1}$, $C_{K2}$, $C_{K3}$, and $C_{K4}$, with respect to each other. Clock signals $C_{K1}$ and $C_{K2}$ are high during the falling edge of the sawtooth waveform $V_{ST}$ during the discharge cycle, where clock signal $C_{K2}$ represents $C_{K1}$ delayed by some predetermined time. Clock signals $C_{K3}$ and $C_{K4}$ are high during the rising edge of the sawtooth waveform $V_{ST}$ during the charge cycle where clock signal $C_{K4}$ represents $C_{K3}$ delayed by some predetermined time.

In operation, gain circuit 64 samples the actual value of the low set point $V_M$ and compares it to half of the reference voltage $V_{ref}$. As a result, gain circuit 64 integrates the error in voltage $V_{EA}$ as feedback to the gate of transistor 56.

Figure 10:
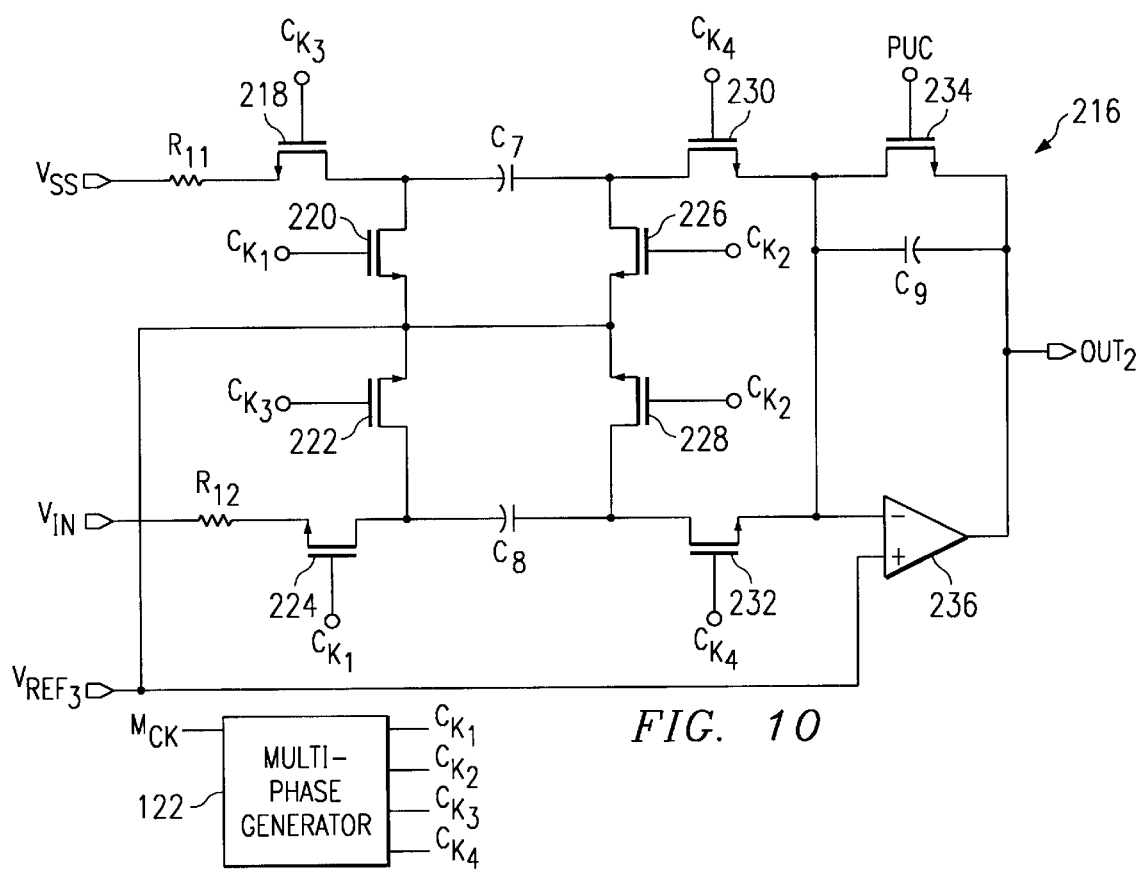
FIG. 10 shows the gain circuit within the control circuit of FIG. 9.

In the alternative, as shown in FIG. 9, a second embodiment may include a control circuit 200 in accordance with the present invention including oscillator 215 and gain circuit 216. The distinctions between the first embodiment 50 and the second embodiment 200 is that the switching circuit 206 includes a p-type transistor 205 coupled between and the non-inverting input of comparator 210, ground and the voltage divider 208 need only include two resistive elements, $R_9$ and $R_{10}$. Moreover, resistor $R_P$ is added to couple between reference voltage $V_{ref}$ and the non-inverting input of comparator 210. Further, gain circuit 216, shown in detail in FIG. 10, distinguishes from the first embodiment 64 in that capacitors, $C_3$ and $C_4$, coupled in parallel in the first embodiment 64 are removed and replace with a single capacitor $C_8$ coupled in series between the drains of the third and sixth transistor, 222 and 228.

Figure 8:
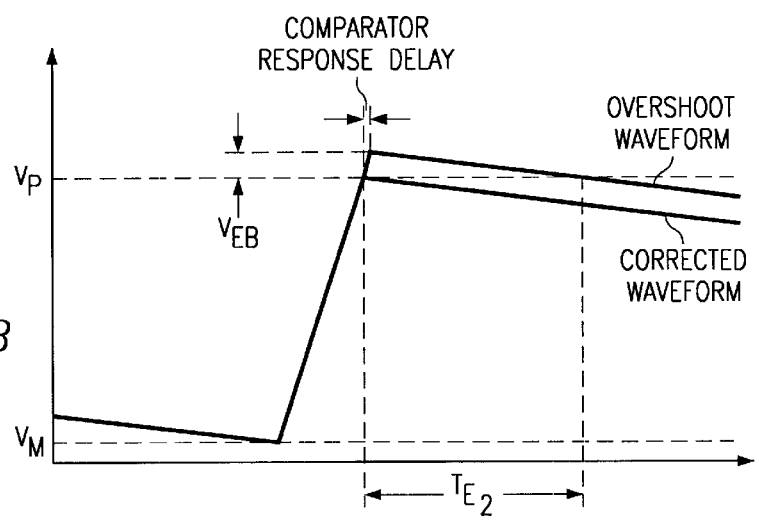
FIG. 8 illustrates an expanded view of the sawtooth reference waveform $V_{st}$ having a slow discharge cycle.

The principle of operation is the same as the first embodiment except the charge cycle voltage is modified to remove the overshoot and provide a corrected waveform, as shown in FIG. 8.

Advantages of this design include but are not limited to a control circuit for a switch mode power converter that does not exhibit overshoot error nor undershoot error during a fast charge cycle or a fast discharge cycle, respectively.

The reader's attention is directed to all papers and documents which are filed concurrently with this specification and which are open to public inspection with this specification, and the contents of all such papers and documents are incorporated herein by reference.

All the features disclosed in this specification (including any accompany claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A control circuit for a switch mode regulator having a fast discharge cycle, the control circuit having a reference voltage level and a power supply, comprising:

an oscillator for providing a periodic carrier signal comprising a sawtooth wave output signal, the oscillator having a first capacitor charged and discharged to the reference voltage to provide the sawtooth wave output signal and a switching circuit coupled to the reference voltage level; and a gain circuit having a reference voltage input, voltage input and an output, the reference voltage input coupled to receive the reference voltage, the voltage input coupled to the first capacitor, the output coupled to the switching circuit to provide feedback proportional to the analog error signal related to the difference between the sawtooth wave output signal and the predetermined reference voltage level.

2. A control circuit as recited in claim 1, wherein the oscillator comprises:

a voltage divider circuit having an input and an output, the input coupled to receive the reference voltage;

a first comparator having a positive input, a negative input, and an output, the positive input coupled to receive the reference voltage;

a second comparator having a positive input, a negative input, and an output, the positive input coupled to the negative input of the first comparator, the negative input coupled to the output of the voltage divider circuit;

a second capacitor coupled between the negative input of the second comparator and ground;

a reset flip-flop having a set input, a reset input, an inverting output and a non-inverting output, the set input coupled to the output of the second comparator, the reset input coupled to the output of the first comparator;

a first current source coupled to the power supply voltage to provide a charge current during the charge cycle;

a first resistor coupled between the first current source and ground;

a second current source to provide a charge current during the discharge cycle;

a second resistor coupled between the second current source and ground;

the first capacitor coupled between ground and the negative input of the first comparator;

a first transistor having a gate, a drain and a source, the drain coupled to the first current source, the source coupled to the first capacitor, the gate coupled to the non-inverting output of the reset flip-flop;

a second transistor having a gate, a drain and a source, the drain coupled to the first capacitor, the source coupled to the second current source, the gate coupled to the inverting output of the reset flip-flop; and a switching circuit coupled to receive the reference voltage and the output of the gain circuit to modify the sawtooth wave signal.

3. The control circuit as recited in claim 2, wherein the voltage divider comprises:

a third resistor coupled to the reference voltage input;

a fourth resistor coupled between the third resistor and ground; and a sixth resistor coupled between the third resistor and the negative input of the second comparator.

4. The control circuit as recited in claim 2, wherein the switching circuit comprises:

a third transistor having a gate, a drain and a source, the source coupled to receive the reference voltage, the gate coupled to the output of the gain circuit; and a third resistor coupled to the drain of the third transistor and the negative input of the second comparator.

5. A control circuit as recited in claim 1, wherein the gain circuit comprises:

a multiphase clock generator for generating a first, second, third and fourth clock signal;

a first resistor coupled to the power supply;

a first transistor having a source, drain, and gate, the source coupled to the first resistor, the gate coupled to receive the third clock signal;

a second transistor having a source, drain, and gate, the drain coupled to the drain of the first transistor, the gate coupled to receive the first clock signal;

a second resistor coupled between the reference voltage input and the source of the second transistor;

a third resistor coupled to the second resistor;

a third transistor having a source, drain, and gate, the source coupled to the source of the second transistor, the gate coupled to receive the third clock signal;

a fourth resistor coupled to the voltage input;

a fourth transistor having a source, drain, and gate, the source coupled to the fourth resistor, the gate coupled to receive the first clock signal, the drain coupled to the drain of the third transistor;

a second capacitor coupled to the drain of the first transistor;

a fifth transistor having a source, drain, and gate, the drain coupled to the second capacitor, gate coupled to receive the second clock signal;

a fifth resistor coupled between the reference voltage input and the source of the fifth transistor;

a sixth resistor coupled to the fifth resistor;

a sixth transistor having a source, drain, and gate, the source coupled to the source of the fifth transistor; the gate coupled to receive the second clock signal;

a third capacitor coupled between the drain of the third transistor and the drain of the sixth transistor;

a fourth capacitor coupled in parallel to the third capacitor;

a seventh transistor having a source, drain, and gate, the drain coupled to the drain of the fifth transistor, the gate coupled to receive the fourth clock signal;

a eight transistor having a source, drain, and gate, the drain coupled to the drain of the sixth transistor, gate coupled to receive the fourth clock signal, the source coupled to the source of the seventh transistor;

a fifth capacitor coupled between the source of the eighth transistor and the output;

a ninth transistor having a source, drain, and gate, the drain coupled to the source of the seventh transistor, gate coupled to receive the power up/clear signal, source coupled to the output; and a comparator, having a positive input, a negative input and an output, the negative input coupled to the source of the eighth transistor, the positive input coupled to the reference voltage input, the output coupled to the output of the gain circuit.

6. A control circuit for a switch mode power converter having a reference voltage, a power supply voltage and ground, comprising:

a voltage divider circuit having an input and an output, the input coupled to receive the reference voltage;

a first comparator having a positive input, a negative input, and an output, the positive input coupled to receive the reference voltage;

a second comparator having a positive input, a negative input, and an output, the positive input coupled to the negative input of the first comparator, the negative input coupled to the output of the voltage divider circuit;

a first capacitor coupled between the negative input of the second comparator and ground;

a reset flip-flop having a set input, a reset input, an inverting output and a non-inverting output, the set input coupled to the output of the second comparator, the reset input coupled to the output of the first comparator;

a first current source coupled to the power supply voltage to provide a charge current during the charge cycle;

a first resistor coupled between the first current source and ground;

a second current source to provide a charge current during the discharge cycle;

a second resistor coupled between the second current source and ground;

a second capacitor coupled between ground and the negative input of the first comparator;

a first transistor having a gate, a drain and a source, the drain coupled to the first current source, the source coupled to the second capacitor, the drain coupled to the non-inverting output of the reset flip-flop;

a second transistor having a gate, a drain and a source, the drain coupled to the second capacitor, the source coupled to the second current source, the gate coupled to the inverting output of the reset flip-flop;

a third transistor having a gate, a drain and a source, the source coupled to receive the reference voltage, the gate coupled to the output of the gain circuit;

a third resistor coupled to the drain of the third transistor and the negative input of the second comparator; and a gain circuit having a first and second input and an output, the first coupled to receive the reference voltage, the second input coupled to the second capacitor, the output coupled to the gate of the third transistor to provide feed back proportional to the voltage error.

7. A control circuit for a switch mode regulator, having a fast charge cycle, the control circuit having a reference voltage level and a power supply, comprising:

an oscillator for providing a periodic carrier signal comprising a sawtooth wave output signal, the oscillator having a first capacitor charged and discharged to the power supply voltage to provide the sawtooth wave output signal and a switching circuit coupled to the reference voltage level; and a gain circuit having a reference voltage input, voltage input and an output, the reference voltage input coupled to receive the reference voltage, the voltage input coupled to the first capacitor, the output coupled to the switching circuit to provide feedback proportional to the analog error signal related to the difference between the sawtooth wave output signal and the predetermined reference voltage level.

8. A control circuit as recited in claim 7, wherein the oscillator comprises:

a voltage divider circuit having an input and an output, the input coupled to receive the reference voltage;

a first comparator having a positive input, a negative input, and an output, the positive input coupled to receive the reference voltage;

a second comparator having a positive input, a negative input, and an output, the positive input coupled to the negative input of the first comparator, the negative input coupled to the output of the voltage divider circuit;

a second capacitor coupled between the negative input of the second comparator and ground;

a reset flip-flop having a set input, a reset input, an inverting output and a non-inverting output, the set input coupled to the output of the second comparator, the reset input coupled to the output of the first comparator;

a first current source coupled to the power supply voltage to provide a charge current during the charge cycle;

a first resistor coupled between the first current source and ground;

a second current source to provide a charge current during the discharge cycle;

a second resistor coupled between the second current source and ground;

the first capacitor coupled between ground and the negative input of the first comparator;

a first transistor having a gate, a drain and a source, the drain coupled to the first current source, the source coupled to the first capacitor, the gate coupled to the non-inverting output of the reset flip-flop;

a second transistor having a gate, a drain and a source, the drain coupled to the first capacitor, the source coupled to the second current source, the gate coupled to the inverting output of the reset flip-flop; and a switching circuit coupled to receive the reference voltage and the output of the gain circuit to modify the sawtooth wave signal.

9. The control circuit as recited in claim 8, wherein the voltage divider comprises:

a third resistor coupled to the reference voltage input; and a fourth resistor coupled between the third resistor to form a node, the node coupled to the negative input of the second comparator.

10. The control circuit as recited in claim 8, wherein the switching circuit comprises:

a third transistor having a gate, a drain and a source, the source coupled to receive the reference voltage, the gate coupled to the output of the gain circuit; and a third resistor coupled to the drain of the third transistor and the negative input of the second comparator.

11. A control circuit as recited in claim 7, wherein the gain circuit comprises:

a multiphase clock generator for generating a first, second, third and fourth clock signal;

a first resistor coupled to the power supply;

a first transistor having a source, drain, and gate, the source coupled to the first resistor, the gate coupled to receive the third clock signal;

a second transistor having a source, drain, and gate, the drain coupled to the drain of the first transistor, the gate coupled to receive the first clock signal, the source coupled to the reference voltage input;

a third transistor having a source, drain, and gate, the source coupled to the source of the second transistor, the gate coupled to receive the third clock signal;

a second resistor coupled to the voltage input;

a fourth transistor having a source, drain, and gate, the source coupled to the fourth resistor, the gate coupled to receive the first clock signal, the drain coupled to the drain of the third transistor;

a second capacitor coupled to the drain of the first transistor;

a fifth transistor having a source, drain, and gate, the drain coupled to the second capacitor, gate coupled to receive the second clock signal, the source coupled to the reference voltage input;

a sixth transistor having a source, drain, and gate, the source coupled to the source of the fifth transistor; the gate coupled to receive the second clock signal;

a third capacitor coupled between the drain of the third transistor and the drain of the sixth transistor;

a seventh transistor having a source, drain, and gate, the drain coupled to the drain of the fifth transistor, the gate coupled to receive the fourth clock signal;

a eight transistor having a source, drain, and gate, the drain coupled to the drain of the sixth transistor, gate coupled to receive the fourth clock signal, the source coupled to the source of the seventh transistor;

a fourth capacitor coupled between the source of the eighth transistor and the output;

a ninth transistor having a source, drain, and gate, the drain coupled to the source of the seventh transistor, gate coupled to receive the power up/clear signal, source coupled to the output; and a comparator, having a positive input, a negative input and an output, the negative input coupled to the source of the eighth transistor, the positive input coupled to the reference voltage input, the output coupled to the output of the gain circuit.

12. A control circuit for a switch mode power converter having a reference voltage, a power supply voltage and ground, comprising:

a voltage divider circuit having an input and an output, the input coupled to receive the reference voltage;

a first comparator having a positive input, a negative input, and an output, the positive input coupled to receive the reference voltage;

a second comparator having a positive input, a negative input, and an output, the positive input coupled to the negative input of the first comparator, the negative input coupled to the output of the voltage divider circuit;

a first capacitor coupled between the negative input of the second comparator and ground;

a reset flip-flop having a set input, a reset input, an inverting output and a non-inverting output, the set input coupled to the output of the second comparator, the reset input coupled to the output of the first comparator;

a first current source coupled to the power supply voltage to provide a charge current during the charge cycle;

a first resistor coupled between the first current source and ground;

a second current source to provide a charge current during the discharge cycle;

a second resistor coupled between the second current source and ground;

a second capacitor coupled between ground and the negative input of the first comparator;

a first transistor having a gate, a drain and a source, the drain coupled to the first current source, the source coupled to the second capacitor, the drain coupled to the non-inverting output of the reset flip-flop;

a second transistor having a gate, a drain and a source, the drain coupled to the second capacitor, the source coupled to the second current source, the gate coupled to the inverting output of the reset flip-flop;

a third transistor having a gate, a drain and a source, the source coupled to receive the reference voltage, the gate coupled to the output of the gain circuit;

a third resistor coupled to the drain of the third transistor and the negative input of the second comparator; and a gain circuit having a first and second input and an output, the first coupled to receive the reference voltage, the second input coupled to the second capacitor, the output coupled to the gate of the third transistor to provide feed back proportional to the voltage error.

* * * * *